United States Patent Office 2,981,762
Patented Apr. 25, 1961

2,981,762
MANUFACTURE OF FLUORO BUTANES
Cyril Woolf, Morristown, N.J., assignor to Allied Chemical Corporation, a corporation of New York
No Drawing. Filed Dec. 13, 1957, Ser. No. 702,522
6 Claims. (Cl. 260—653.7)

This invention is directed to processes for manufacture of 1,1,1,2,4,4,4 heptafluoro 2,3,3 trichloro butane, $CF_3CClFCCl_2CF_3$, a clear, colorless liquid having a boiling point of 98° C. at atmospheric pressure. This material is a known compound of commerce, and is useful as a coolant.

It has been proposed to make $CF_3CClFCCl_2CF_3$ by high pressure autoclave reaction of $CF_3CCl:CClCF_3$ with hydrogen fluoride and chlorine in the presence of pentavalent antimony catalyst. With regard to fluorinating processes in general utilizing the antimony route, operating procedures are subject to many recognized disadvantages among which are the corrosiveness of the antimony halide, the difficulty of operation involved by reason of the use of liquid reactant as distinguished from a solid catalyst, and the relatively high volatility of antimony halides thereby giving rise to formation of products which contain small amounts of the fluorinating agent as impurity which is not easily removed. While practicable, the disadvantages of the fluorination operations involving use of antimony salts are apparent to those skilled in the art.

A major object of the present invention lies in the provision of a solid catalyst, gas-phase method for making $CF_3CClFCCl_2CF_3$ by HF fluorination of certain butane or butene starting materials while in the presence or absence of elemental chlorine.

In accordance with the invention, it has been found that a certain class or group of butanes or butenes or mixtures of both possess physical and chemical properties such as to render these compounds particularly suitable organic starting materials for production of $$CF_3CClFCCl_2CF_3$$

by catalytic gas-phase operation. Further, it has been found that certain zirconium-activated carbon materials possess the properties of effectively promoting reaction, in the presence or absence of elemental chlorine, of anhydrous HF and the herein organic starting materials. Hence, the invention comprises the discovery or selection of certain starting materials, and the conjunctive relation of the same with the herein zirconium salt catalysts and certain reaction conditions, which interrelated factors result in provision of an easily controllable, all gas-phase truly catalytic procedure, in accordance with which the desired $CF_3CClFCCl_2CF_3$ may be made in good yields.

The butane and butene starting materials of the invention process are fluorinated straight-chain 4 carbon atom hydrocarbons both primary carbon atoms of which are trifluorinated and both secondary carbon atoms of which contain a total of zero to 4 chlorine atoms and are free of other substituents. Specific examples of these starting materials include: butanes such as $$CF_3CCl_2CCl_2CF_3$$

normally a white colored solid having a melting point of 83° C. and B.P. of about 131° C.;

$$CF_3CHClCCl_2CF_3$$

a colorless liquid, B.P. of about 104° C.;

$$CF_3CHClCHClCF_3$$

a colorless liquid, B.P. of about 78° C.;

$$CF_3CH_2CHClCF_3$$

a colorless liquid, B.P. of about 51° C.;

$$CF_3CH_2CH_2CF_3$$

a colorless liquid, B.P. of about 24.6° C. and butenes such as $CF_3CCl:CClCF_3$, a colorless liquid, B.P. of about 67° C.; $CF_3CH:CClCF_3$, a colorless liquid, B.P. of about 35° C.; $CF_3CH:CHCF_3$, a colorless liquid, B.P. of about 33.2° C.; and $CF_3CH:CHCF_3$ trans isomer, a colorless liquid, B.P. about 8.5° C. All the foregoing compounds are characterized by being fluorinated straight-chain 4 carbon atom hydrocarbons both primary or terminal carbon atoms of which are fully substituted by fluorine, and both secondary carbon atoms may contain a total of from zero to 4 chlorine atoms, and are free of other substituents, that is, secondary carbon atoms are linked to only chlorine or hydrogen or to chlorine and hydrogen.

The catalytic material utilized in practice of the invention may be made for example by impregnating activated carbon, of say 4–15 mesh size granulation, with an aqueous solution of a zirconium salt, such as zirconyl chloride $ZrOCl_2$, and drying at 125–200° C. in an inert gas stream such as nitrogen. Then the material is gassed with HF to convert the zirconium to $ZrF_4$, temperatures being maintained above 125° C. and preferably at about 150–200° C. Water and HCl formed during the reaction pass off in the vapor state. Gassing with HF is continued until tail gases of the HF gassing operation indicate that evolution of HCl and water has ceased.

Raw material serving as the source of zirconium may be any zirconium salt which is soluble in vaporizable solvent and which reacts with HF to form $ZrF_4$ and a by-product vaporizing at the temperature of HF gassing. Thus, materials such as $ZrOCl_2$, $ZrO(NO_3)_2$, and $ZrOCO_3$, $ZrO(OH)_2$ and also anhydrous $ZrCl_4$ may be used. While aqueous hydrochloric acid and water are the more desirable solvents, other suitable solvents may be employed. For example, a catalyst containing 20 weight parts of $ZrF_4$ per 100 parts of Columbia 6G carbon may be made by dissolving 28 grams of substantially anhydrous $ZrCl_4$ in 200 cc. of 10% hydrochloric acid, adding the liquid to 100 grams of the carbon, evaporating to dryness, transferring the impregnated carbon into a tubular nickel reactor heated by electric furnace, and passing preferably anhydrous HF into the impregnated carbon maintained at about 150–200° C. until evolution of water and HCl ceases.

In making the catalyst, any of the commercially available activated carbons may be employed, e.g. Columbia 6G carbon, Columbia SW carbon, or Darco carbon. The relative quantities of activated carbon and e.g. zirconyl chloride initially employed may be such as to form an ultimate zirconium tetrafluoride-activated carbon mass which contains desirably a major quantity by weight of activated carbon and a minor quantity by weight of $ZrF_4$. On the other hand, amounts of zirconium salt and activated carbon may be such as to form a final zirconium tetrafluoride-activated carbon catalyst containing as little as about 5% by weight of $ZrF_4$. The catalyst preferably employed in practice of the invention may be considered as a zirconium tetrafluoride on activated carbon mass containing about 5–40% by weight of $ZrF_4$.

Practice of the invention involves subjecting gas-phase starting material—such starting material being a fluorinated straight-chain 4 carbon atom hydrocarbon both primary carbon atoms of which are trifluorinated and both secondary carbon atoms of which contain a total of zero to 4 chlorine atoms and are free of other substituents—to the action of gaseous anhydrous hydrogen fluoride in the presence of the hereindescribed zirconium tetrafluoride-activated carbon catalyst in a suitable reaction zone at elevated fluorination temperatures and, depending upon saturation or unsaturation and upon complete or partial chlorination of secondary carbon atoms of the starting material, in the absence or presence of elemental chlorine; and recovering from the reaction zone exit the sought-for $CF_3CClFCCl_2CF_3$ product. Reactions involved in use of the various suitable starting materials may be represented by—

$$CF_3CCl_2CCl_2CF_3 + HF \rightarrow CF_3CClFCCl_2CF_3 + HCL$$

$$CF_3CHClCCl_2CF_3 + Cl_2 + HF \rightarrow CF_3CClFCCl_2CF_3 + 2HCl$$

$$CF_3CH_2CH_2CF_3 + 4Cl_2 + HF \rightarrow CF_3CClFCCl_2CF_3 + 5HCl$$

$$CF_3CHClCHClCF_3 + 2Cl_2 + HF \rightarrow CF_3CClFCCl_2CF_3 + 3HCl$$

$$CF_3CCl{:}CClCF_3 + Cl_2 + HF \rightarrow CF_3CClFCCl_2CF_3 + HCl$$

$$CF_3CH{:}CClCF_3 + 2Cl_2 + HF \rightarrow CF_3CClFCCl_2CF_3 + 2HCl$$

$$CF_3CH{:}CHCF_3 + 3Cl_2 + HF \rightarrow CF_3CClFCCl_2CF_3 + 3HCl$$

The more desirable starting materials, whether saturated or unsaturated, are those containing no hydrogen. The preferred individual starting material is the saturated perhalogenated compound $CF_3CCl_2CCl_2CF_3$.

In all embodiments of the invention, reaction temperature should be not less than about 275° C. However, at about 300° C. in the presence of HF and the described catalyst, and in the presence of elemental chlorine if required, more practical fluorination takes hold, and progresses at reasonable contact time. It has been found that at temperatures above about 390° C. fragmentation, with formation of some ethane by-product, is incipient. Accordingly, temperatures above about 390° C. are undesirable in some circumstances, and it has been found that best overall results are obtainable in the preferred temperature range of 300–350° C. If operating conditions are such that some fragmentation is not practically objectionable, temperatures may be as high as about 425° C.

As indicated above, use of elemental chlorine, if any and if so in what quantity, is dependent upon the nature of the starting material, i.e. whether the starting material is saturated or unsaturated, or whether the secondary carbon atoms are fully or only partially substituted by chlorine. It will be understood that with respect to any of the disclosed starting materials except $$CF_3CCl_2CCl_2CF_3$$

saturation and/or full substitution by chlorine of the secondary carbon atoms may be effected in a separate preliminary stage, e.g. by subjecting such starting material to the action of adequate quantities of chlorine alone at temperatures of say 250 to 350° C. in the presence of suitable catalysts such as activated carbon. However, an advantage of the invention, arising out of the use of the described zirconium tetrafluoride-activated carbon catalyst, is that saturation if necessary, and full substitution by chlorine of secondary carbon atoms if necessary, together with fluorination may be effected conveniently in a single reaction stage.

Where the starting material employed is other than $CF_3CCl_2CCl_2CF_3$, in the preferred embodiments, fluorination is carried out while in the presence of sufficient chlorine to provide for any unsaturation of the starting materials and for any incomplete chlorination of secondary carbon atoms of such starting material. Theoretical requirements as to quantities of chlorine needed in various modifications of the invention are indicated above. In large-scale work, when chlorine is employed, it is preferred to utilize elemental chlorine in amount equivalent to a relatively small, e.g. 3–7 weight percent molecular excess over that needed theoretically to provide for any unsaturation and for any incomplete chlorination of secondary carbon atoms.

Mol ratio of HF to organic starting material is variable to some extent. Theoretical requirements of HF are one mol of HF per mol of butane or butene. In any case, enough anhydrous HF is employed to react with a substantial amount of the particular starting material to form a substantial quantity of $CF_3CClFCCl_2CF_3$. While more than theoretical quantities of HF may be employed, it is desirable to use quantities of HF which approach but do not substantially exceed stoichiometric proportions. It has been found that, when employing the catalysts described, if the HF molar ratio is increased appreciably above the 1:1 ratio, utilization of HF decreases markedly with insufficient worthwhile increase of product formation. In large-scale work, to effect higher utilization of HF, it is preferred to employ HF in amount equivalent to a relatively small, e.g. 10–20 weight percent molecular deficiency based on theoretical requirements.

Contact time may be varied considerably without noticeable disadvantage to high process efficiency. Increasing contact time and reactor temperature result in higher HF conversion and higher conversion of starting material to sought-for product, and lowering contact time and reactor temperature result in lower HF conversion. In general, contact time may lie in the range of 2 to 30 seconds, and preferably in the range of 5–15 seconds. To a substantial extent, contact time, reaction temperature and ratio of reactants are interrelated, and product formation may be varied by alteration of one or more of these factors. Depending upon the starting material used, optimum conditions may be determined by test runs.

In general practice, organic starting material and anhydrous HF are vaporized and metered, along with chlorine if needed, into a tubular reactor packed with catalyst, and made of suitable inert material such as nickel, and provided with external heating equipment preferably including automatic means for maintaining given temperatures in the reaction zone. Product recovery may be effected more or less conventionally as in this art. For example, reactor exit gases may be passed into an ice cooled water scrubber to absorb HCl and any unreacted or excess HF, and to condense the organic products and any unreacted starting material. Tail gas of the water scrubber may be passed thru a caustic scrubber to remove any chlorine. Organics and water may be separated by stratification and decantation, and after drying and filtering, the organics may be separated and isolated by distillation.

The following examples typify practice of the invention. A ZrF$_4$-on-activated carbon catalyst was made substantially as follows: Commercial ZrCl$_4$ was dissolved in water and poured over Columbia 6G activated carbon of 4–14 mesh, the amount of ZrCl$_4$ being such that the weight ratio of carbon to ZrCl$_4$ was 10:1. The mixture was evaporated and dried at about 150° C., and about 200 cc. were charged into and filled about the middle 16 inches of a reactor comprising a one inch I.D. nickel tube about 36 inches long and heated over a length of about 30 inches by a tubular electric heating unit. Temperature was maintained in the reactor at about 200° C. to drive off residual water, and then the mass was gassed with anhydrous HF at about 200° C. until evolution of HCl ceased. The finished catalyst contained about 6.7% by weight of ZrF$_4$ and about 93.3% by weight of carbon. The reactor was provided at one end with feed inlets and at the other end with a pipe connection leading to a recovery unit.

*Example 1.*—The organic starting material employed was $CF_3CCl_2CCl_2CF_3$, normally a solid material, melting at 83° C. and boiling at about 131° C. In view of the melting point of $CF_3CCl_2CCl_2CF_3$, to facilitate metering, there was first made up a solution of $$CF_3CCl_2CCl_2CF_3$$

in liquid $CF_3CCl:CClCF_3$ (B.P. 67° C.), quantities of organic materials being such that the solution contained 50% by weight of $CF_3CCl_2CCl_2CF_3$. Under the conditions of reaction, i.e. the absence of chlorine, the $$CF_3CCl:CClCF_3$$

functioned only as a diluent and did not react. During about 2 hours, about 0.85 mol of gaseous anhydrous HF, and a vaporous mixture of about 2.20 mols of $CF_3CCl:CClCF_3$ and 1.69 mols of $CF_3CCl_2CCl_2CF_3$ were metered and fed into the reactor at approximately constant rate. Mol ratio of $CF_3CCl_2CCl_2CF_3$ to HF was about 1:0.5. Throughout the run, internal temperature in the reactor was maintained at about 335° C., and contact time was about 6 seconds. Exit gases of the reactor were passed into an ice cooled water scrubber in which HCl and any HF were absorbed, and $CF_3CCl:CClCF_3$, unreacted $CF_3CCl_2CCl_2CF_3$, and organic reaction products were condensed. The oily organic and water layers were separated, and the organic layer was dried with $CaCl_2$ and filtered. About 3.9 mols of organic compounds were recovered. HF utilization was about 76%. The dried and filtered organic products were distilled, and there were recovered as condensate about 0.51 mol of an oily colorless liquid identified as $CF_3CClFCCl_2CF_3$ (B.P. 98° C.). Conversion of $CF_3CCl_2CCl_2CF_3$ to organic products was about 34% by weight, and yield of $CF_3CClFCCl_2CF_3$, based on the amount of $$CF_3CCl_2CCl_2CF_3$$

converted was about 89% by weight.

*Example 2.*—The organic starting material was $$CF_3CCl:CClCF_3$$

and the apparatus and catalyst were the same as in Example 1. Over the course of about 3 hours, about 1.76 mols of gaseous anhydrous HF, about 3.1 mols of $$CF_3CCl:CClCF_3$$

and about 2.74 mols of elemental chlorine were charged into the reactor at about constant rate. Mol ratio of organic starting material to HF was about 1:0.57, and mol ratio of organic starting material to elemental chlorine was about 1:0.88. Internal temperature in the reactor was maintained at about 300–310° C. Off-gas of the reactor was handled substantially as in Example 1. About 3.06 mols of organic compounds were recovered. HF utilization was about 46%, and chlorine utilization about 90%. On distillation of the organic compounds obtained from the reactor, there were recovered as condensate about 0.53 mol of $CF_3CClFCCl_2CF_3$. Conversion of organic starting material to organic products was about 79% by weight, and yield of $CF_3CClFCCl_2CF_3$, based on the amount of starting material converted, was about 22% by weight, the remainder of the starting material being substantially all converted to $$CF_3CCl_2CCl_2CF_3$$

which may be recycled.

*Example 3.*—Organic starting material employed was $CF_3CH:CClCF_3$ (B.P. 35° C.), and the apparatus and catalyst were the same as in Example 1. During about 95 minutes 1.7 mols of anhydrous HF, 3.67 mols of elemental chlorine and about 1.57 mols of $CF_3CH:CClCF_3$ were passed into the reactor at approximately constant rate. Mol ratio of organic starting material to HF was about 1:1.08, and mol ratio of organic starting material to elemental chlorine was about 1:2.2. Throughout the run, internal temperature in the reactor was maintained at about 425° C., and contact time was about 2 seconds. Exit gases of the reactor were handled as in Example 1. HF utilization was about 46%, and chlorine utilization was about 100%. The dried and filtered organic products recovered from the reactor were distilled, and there were recovered, a small amount of $CF_3CCl_3$, and from about 88 grams of a fraction boiling in the range of 90–100° C., about 0.31 mol of $CF_3CClFCCl_2CF_3$. Conversion of organic starting material to organic products was about 100% by weight, and yield of $CF_3CClFCCl_2CF_3$, based on the amount of starting material converted, was about 20% by weight.

I claim:

1. The process for making $CF_3CClFCCl_2CF_3$ which comprises subjecting gas-phase starting material—said starting material being a fluorinated straight-chain 4 carbon atom hydrocarbon both primary carbon atoms of which are trifluorinated and both secondary carbon atoms of which contain a total of zero to 4 chlorine atoms and are free of other substituents—at temperatures substantially in the range of 275–425° C. and while in the presence of a zirconium tetrafluoride-activated carbon catalyst and while in the presence of sufficient chlorine to provide for any unsaturation of said starting material and for any incomplete chlorination of the secondary carbon atoms of said starting material, to the action of gaseous anhydrous hydrogen fluoride in quantity and for a time sufficient to fluorinate a substantial amount of said starting material and to form substantial amount of $CF_3CClFCCl_2CF_3$, and recovering $CF_3CClFCCl_2CF_3$ from the resulting reaction products.

2. The process of claim 1 in which temperature is substantially in the range of 300–390° C.

3. The process of claim 1 in which the said starting material is substantially free of hydrogen.

4. The process of claim 1 in which, with reference to the organic starting material, any chlorine present is present in amount constituting a relatively small molecular excess over that needed to provide for any unsaturation and for any incomplete chlorination of secondary carbon atoms, and hydrogen fluoride is present in amount constituting a relatively small molecular deficiency.

5. The process for making $CF_3CClFCCl_2CF_3$ which comprises subjecting gas-phase $CF_3CCl_2CCl_2CF_3$ starting material, at temperatures substantially in the range of 300–390° C. and while in the presence of zirconium tetrafluoride-activated carbon catalyst, to the action of gaseous anhydrous hydrogen fluoride in quantity and for a time sufficient to fluorinate a substantial amount of said starting material and to form substantial amount of $$CF_3CClFCCl_2CF_3$$

and recovering $CF_3CClFCCl_2CF_3$ from the resulting reaction products.

6. The process of claim 5 in which temperature is substantially in the range of 300–350° C., and the operation is carried out, with reference to said $$CF_3CCl_2CCl_2CF_3$$

in the presence of hydrogen fluoride in amount constituting a relatively small molecular deficiency.

References Cited in the file of this patent

UNITED STATES PATENTS

| | | |
|---|---|---|
| 2,714,618 | Woolf | Aug. 2, 1955 |
| 2,862,036 | Baranauckas et al. | Nov. 25, 1958 |